United States Patent [19]
Kamagata et al.

[11] Patent Number: 5,477,549
[45] Date of Patent: Dec. 19, 1995

[54] CELL SWITCH AND CELL SWITCH NETWORK USING DUMMY CELLS FOR SIMPLIFIED CELL SWITCH TEST IN COMMUNICATION NETWORK

[75] Inventors: Eiji Kamagata; Yasuro Shobatake, both of Kanagawa, Japan

[73] Assignee: Kabushiki Kaisha Toshiba, Kawasaki, Japan

[21] Appl. No.: 420,904

[22] Filed: Apr. 11, 1995

Related U.S. Application Data

[63] Continuation of Ser. No. 818,121, Jan. 8, 1992, abandoned.

[30] Foreign Application Priority Data

Jan. 8, 1991 [JP] Japan ................... 3-000754

[51] Int. Cl.[6] ................... G06F 13/00; H04L 12/00
[52] U.S. Cl. ................... 371/22.5; 371/22.3; 371/22.6; 370/60
[58] Field of Search ................... 395/200, 275; 370/22.5, 22.1, 60; 371/22.3, 22.6, 22.5; 398/201, 278

[56] References Cited

U.S. PATENT DOCUMENTS

| | | | |
|---|---|---|---|
| 3,787,669 | 1/1974 | Muehldorf | 235/152 |
| 4,293,950 | 10/1981 | Shimizu et al. | 371/21 |
| 4,554,659 | 11/1985 | Blood et al. | 370/88 |
| 4,912,709 | 3/1990 | Teske et al. | 371/22.1 |
| 5,056,094 | 10/1991 | Whetsel | 371/25.1 |
| 5,084,874 | 1/1992 | Whetsel, Jr. | 371/22.3 |
| 5,166,926 | 11/1992 | Cigneros et al. | 370/60 |
| 5,208,809 | 5/1993 | Fergeson et al. | 370/91 |
| 5,210,744 | 5/1993 | Yamanaka et al. | 370/60 |
| 5,241,534 | 8/1993 | Omuro et al. | 370/16 |
| 5,251,204 | 10/1993 | Izawa | 370/15 |
| 5,369,634 | 11/1994 | Denissen | 370/17 |

Primary Examiner—Christopher B. Shin
Attorney, Agent, or Firm—Oblon, Spivak, McClelland, Maier & Neustadt

[57] ABSTRACT

A cell switch and a cell switch network with a simplified cell switch testing such that the testing processes can be carried out quickly and easily. The cell switch includes a dummy cell generation circuit for generating dummy cells in correspondence to the output transmission paths; and an output control circuit for selectively outputting the dummy cells to the output transmission paths when a test of the cell switch is indicated by an externally provided control signal. In a cell switch network in which the cell switches are interconnected in a form of a multi-step configuration, the cell switches belonging to each step in the multi-step configuration of the cell switch network is tested sequentially, by supplying the control signal to each of the cell switches belonging to each step in the multi-step configuration of the cell switch network sequentially, in a reverse order of steps in the multi-step configuration of the cell switch network.

16 Claims, 5 Drawing Sheets

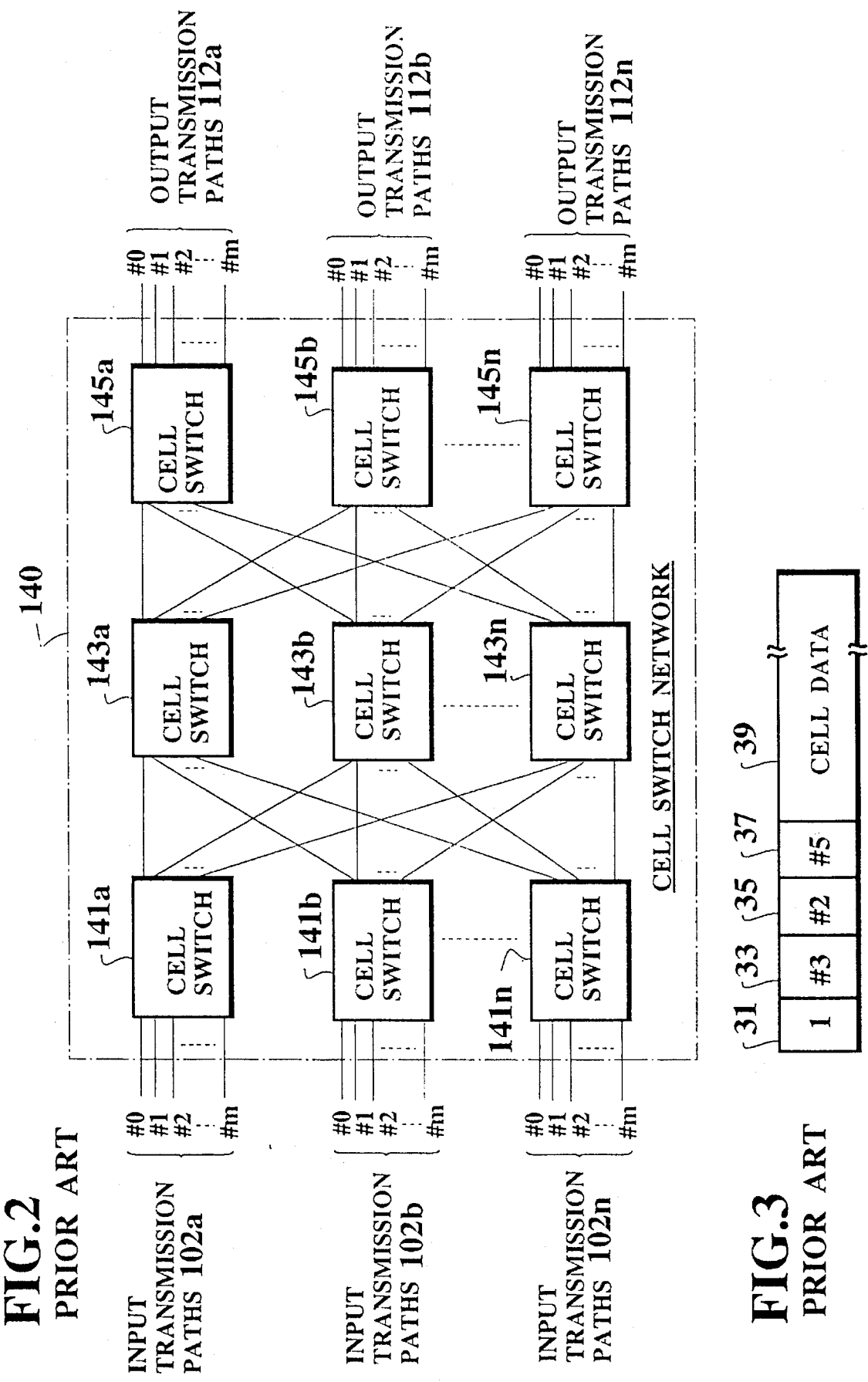

CELL SWITCH AND CELL SWITCH NETWORK USING DUMMY CELLS FOR SIMPLIFIED CELL SWITCH TEST IN COMMUNICATION NETWORK

This application is a Continuation of application Ser. No. 07/818,121, filed on Jan. 8, 1992, now abandoned.

BACKGROUND OF THE INVENTION

1. Field of the Invention

The present invention relates to a cell switch to be used in an ATM communication network system.

2. Description of the Background Art

Conventionally, a so called STM (Synchronous Transfer Mode) in which a data transfer capacity required by a communication is allocated at a time of a call set up has been used extensively for a telephone network. More recently, in order to realize the higher speed and wider bandwidth network, a so called ATM (Asynchronous Transfer Mode) in which each terminal uses a data transfer capacity of the network as much as necessary when the need for the communication arises has been developed.

In this ATM, the data are transferred in units of packets of a fixed length called cells, in which a routing information is indicated in a header of each cell. The ATM is characterized in that each terminal transfers the cells to the network according to the need for the communication such that each terminal uses a data transfer capacity of the network only as much as necessary for the communication when the need for the communication arises.

In the communication network system using the ATM, it is necessary to provide a number of cell switches which switch, i.e., distribute, the cells entering from a plurality of input transmission paths into the appropriate one of a plurality of output transmission paths according to the routing information indicated in the header of each cell.

An exemplary configuration of a conventional cell switch is shown in FIG. 1.

This conventional cell switch 101 of FIG. 1 comprises: a plurality of input transmission paths 102 including S channels #0, #1, . . . , #m from which the cells are entered; an input conversion unit 105 including a serial to parallel converter (not shown) and a multiplexer (not shown) for appropriately converting the cells entered from the input transmission paths 102; a buffer memory 107 for storing the entered cells converted by the input conversion unit 10S; a plurality of output transmission paths 112 including channels #0, #1, . . . , #m from which the cells are outputted; an output conversion unit 115 including a parallel to serial converter (not shown) and a de-multiplexer (not shown) for appropriately converting the cells to be outputted from the output transmission paths 112; and a buffer control circuit 117 for controlling the writing and reading of the cells to and from the buffer memory 107.

In this conventional cell switch 101, when the cell to be transferred through a specific channel is present in the buffer memory 107, that cell is read out from the buffer memory 107 under the control by the buffer control circuit 117, appropriately converted by the de-multiplexing and the parallel to serial conversion at the output conversion unit 115, and outputted from the specific channel of the output transmission paths 112. In a case, where is no cell in the buffer memory 107 which is to be outputted through the specific channel of the output transmission paths 112, an empty cell of a prescribed format which carries no data is automatically set for that specific channel such that the empty cell which has been appropriately converted by the de-multiplexing and the parallel to serial conversion at the output conversion unit 115 is outputted from that specific channel of the output transmission paths 112.

Now, in the ATM communication network, a plurality of such cell switches are inter-connected together in a number of steps to form a cell switch network to be able to handle a large number of input transmission paths and output transmission paths.

An exemplary configuration of a cell switch network using a plurality of conventional cell switches similar to the cell switch of FIG. 1 is shown in FIG. 2.

This cell switch network 140 of FIG. 2 comprises: a plurality of first step cell switches 141a, 141b, . . . , 141n having a plurality of input transmission paths 102a, 102b, . . . , 102n through which the cells are entered into the cell switch network 140; a plurality of second step cell switches 143a, 143b, . . . , 143n having the input transmission paths inter-connected with the output transmission paths of the first step cell switches 141a, 141b, . . . , 141n; and a plurality of third step cell switches 145a, 145b, . . . , 145n having the input transmission paths inter-connected with the output transmission paths of the second step cell switches 143a, 143b, . . . , 143n, and a plurality of output transmission paths 112a, 112b, . . . , 112n through which the cells are outputted from the cell switch network 140, where each of the input transmission paths and output transmission paths includes the channels #0 to #m.

In this cell switch network 140, the cells in a format shown in FIG. 3 is used. Namely, each cell to be entered into this cell switch network 140 has a top bit field 31 for indicating whether this cell is a valid cell or an empty cell; a first header field 33 for indicating the routing information to be used at the first step cell switches; a second header field 35 for indicating the routing information to be used at the second step cell switches; a third header field 37 for indicating the routing information to be used at the third step cell switches; and a cell data field 39.

In the top bit field 31, a value 1 indicates that it is a valid cell while a value 0 indicates that it is an empty cell, for example. In the first, second, and third header fields 33, 35, and 37, the value indicates the channel through which it should be transmitted at the respective step. Accordingly, when this cell of FIG. 3 is entered into the cell switch network 140, the first step cell switch which received this cell will transmit it to the second step cell switches through the channel #3 according to the first header field 33, the second step cell switch which received this cell will transmit it to the third step cell switches through the channel #2 according to the second header field 35, and the third step cell switch which received this cell will outputs through the channel #5 of its output transmission paths.

Now, such a conventional multi-step cell switch network has been associated with the following problems.

First, in such a conventional multi-step cell switch network, a number of connection lines connecting the cell switches are quite numerous and each cell switch must be connected with quite a large number of other cell switches, so that it has been difficult to carry out the verification of the proper connections by the connecting lines, which is necessary at a time of installment of the device incorporating such a cell switch network for instance.

Namely, such a verification has been carried out by externally supplying a huge number of test cells designed to pass through all the possible routes inside the cell switch network from the input transmission paths of the cell switch network and by inspecting the cells outputted from the output transmission paths of the cell switch network, which is an extremely tedious and time consuming procedure.

Moreover, in such a conventional multi-step cell switch network, a number of input transmission paths and a number of output transmission paths are connected with respect to a plurality of other cell switches or external devices, so that it has been difficult to carry out the check of the cell input and output operation timings between the inter-connected cell switches or external devices.

In addition, for the similar reasons as described above, it has also been difficult in such a conventional multi-step cell switch network to carry out the check and the adjustment of the cell input and output phase relationships, i.e., the phase relationships between the system clock signals supplied to the cell switches or the external devices with respect to the timings for the input and output of the cells.

In particular, there is no way of inputting and outputting the cells directly to and from the cell switches belonging to intermediate steps in a multi-step network configuration such as the second step cell switches 143a to 143n in the cell switch network 140 of FIG. 2, so that the check of the cell input and output operation timings and the adjustment of the cell input and output phase relationships have been impossible for such cell switches belonging to intermediate steps in a multi-step network configuration.

Furthermore, the operation characteristics of the cell switch, such as an operation speed, can be affected by the temperature of the cell switch itself, so that even when the adjustment of the cell input and output phase relationships between the cell switches and the external devices are made at some point, the cell input and output phase relationships can be changed as a result of the change of the temperature of the cell switches. As a result, it has been almost impossible in a conventional multi-step cell switch network to maintain the properly adjusted cell input and output phase relationships between the cell switches and the external devices.

SUMMARY OF THE INVENTION

It is therefore an object of the present invention to provide a cell switch and a cell-switch network capable of enabling a simplified cell switch testing for the verification of the proper connections, the check of the cell input and output operation timings, and the check of the cell input and output phase relationships, such that these testing processes can be carried out quickly and easily.

According to one aspect of the present invention there is provided a cell switch for switching cells entering from a plurality of input transmission paths to a plurality of output transmission paths according to a routing information indicated in a header of each cell, the cell switch comprising: buffer memory means, connected with the input transmission paths and the output transmission paths, for storing the cells entered from the input transmission paths; buffer memory control means for controlling writing and reading operations with respect to the buffer memory means according to the routing information indicated in a header of each cell; dummy cell generation means for generating dummy cells for a test of the cell switch different from the cells for the data transmission in correspondence to the output transmission paths: and output control means for selectively outputting the dummy cells generated by the dummy cell generation means to the output transmission paths when a test of the cell switch is indicated by an externally provided control signal, and selectively outputting the cells outputted from the buffer memory means to the output transmission paths otherwise.

According to another aspect of the present invention there is provided a cell switch network comprising: a plurality of inter-connected cell switches for switching cells entering from a plurality of input transmission paths to a plurality of output transmission paths according to a routing information indicated in a header of each cell, each cell switch including: buffer memory means, connected with the input transmission paths and the output transmission paths, for storing the cells entered from the input transmission paths; buffer memory control means for controlling writing and reading operations with respect to the buffer memory means according to the routing information indicated in a header of each cell; dummy cell generation means for generating dummy cells in correspondence to the output transmission paths; and output control means for selectively outputting the dummy cells generated by the dummy cell generation means to the output transmission paths when a test of the cell switch is indicated by an externally provided control signal, and selectively outputting the cells outputted from the buffer memory means to the output transmission paths otherwise.

According to another aspect of the present invention there is provided a method of testing a cell switch network formed by a plurality of inter-connected cell switches for switching cells entering from a plurality of input transmission paths to a plurality of output transmission paths according to a routing information indicated in a header of each cell, the method comprising the steps of: (a) equipping each cell switch of the cell switch network with: dummy cell generation means for generating dummy cells in correspondence to the output transmission paths; and output control means for selectively outputting the dummy cells generated by the dummy cell generation means to the output transmission paths when a test of the cell switch is indicated by an externally provided control signal; (b) inter-connecting the cell switches of the cell switch network in a form of a multi-step configuration; and (c) testing the cell switches belonging to each step in the multi-step configuration of the cell switch network sequentially, by supplying the control signal to each of the cell switches belonging to each step in the multi-step configuration of the cell switch network sequentially, in a reverse order of steps in the multi-step configuration of the cell switch network, starting from the cell switches belonging to a last step in the multi-step configuration of the cell switch network and up to the cell switches belonging to a first step in the multi-step configuration of the cell switch network.

Other features and advantages of the present invention will become apparent from the following description taken in conjunction with the accompanying drawings.

BRIEF DESCRIPTION OF THE DRAWINGS

FIG. 2 is a schematic block diagram of a conventional cell switch network formed by inter-connecting a plurality of cell switches similar to the cell switch of FIG. 1.

FIG. 3 is a diagram of a format for the cell to be used in the cell switch network of FIG. 2.

DETAILED DESCRIPTION OF THE PREFERRED EMBODIMENTS

Figure 1:
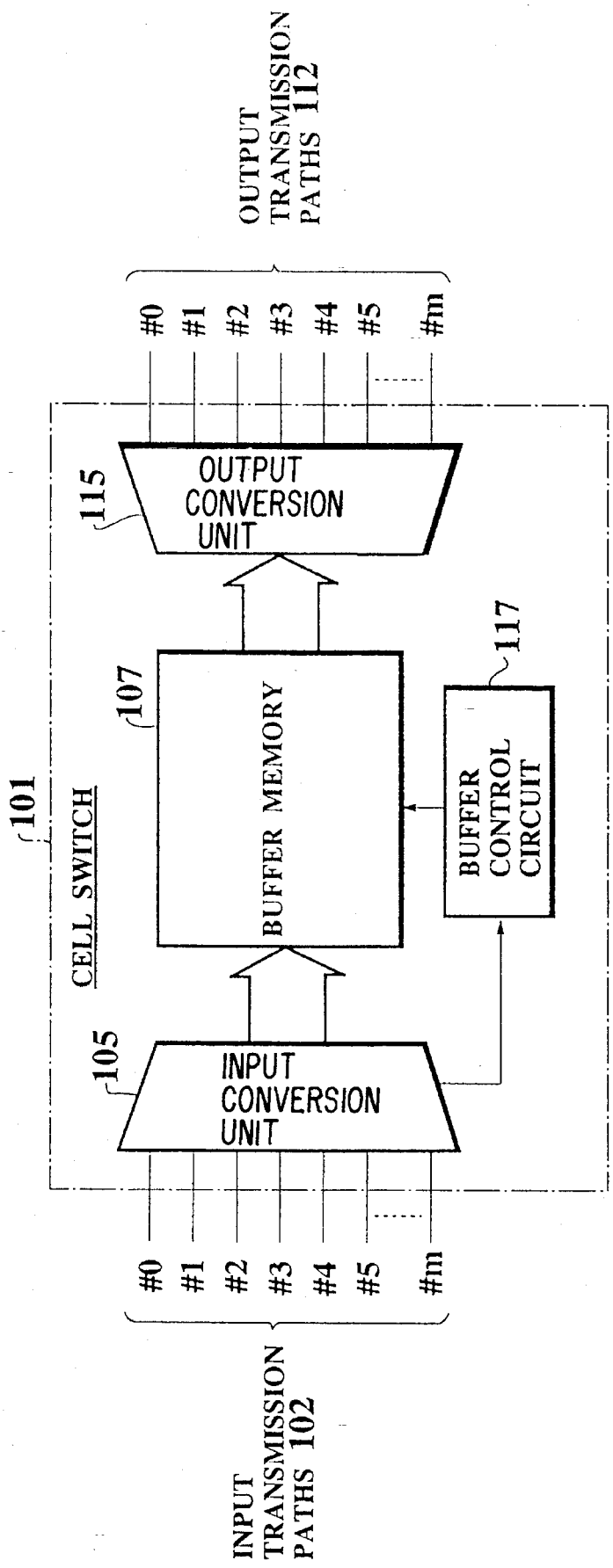
FIG. 1 is a schematic block diagram of a conventional cell switch.
Figure 4:
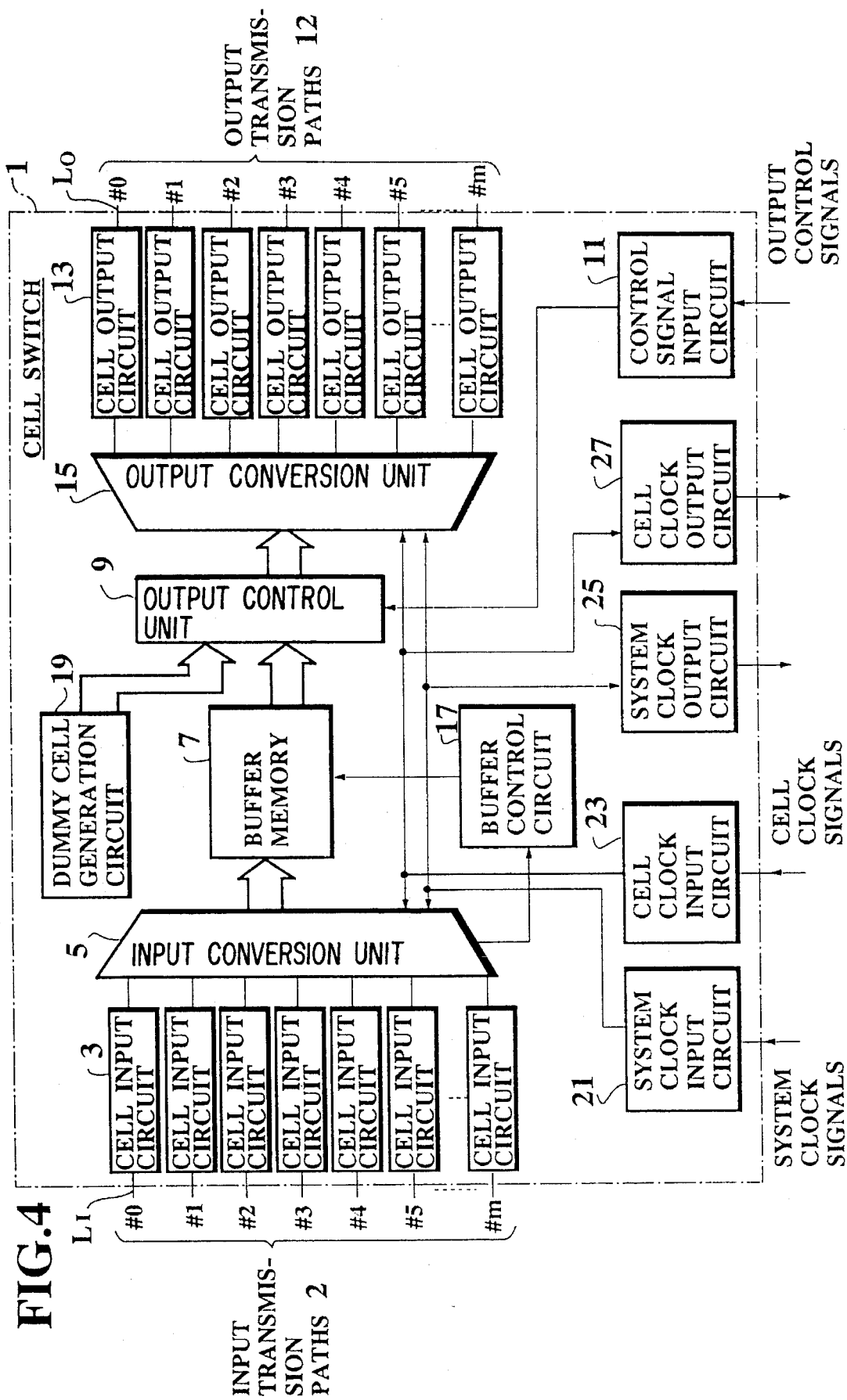
FIG. 4 is a schematic block diagram of one embodiment of a cell switch according to the present invention.

Referring now to FIG. 4, one embodiment of a cell switch according to the present invention will be described in detail.

In this embodiment, a cell switch 1 comprises a plurality of input transmission paths 2 including channels #0, #1, . . . , #m from which the cells are entered. A plurality of cell input circuits 3, are provided in correspondence to the channels of the input transmission paths 2, for receiving the cells entering through the input transmission paths 2. An input conversion unit 5 including a serial to parallel converter (not shown) and a multiplexer (not shown) for appropriately converting the cells received by the input circuits 3 are also provided. A buffer memory 7 stores the entered cells converted by the input conversion unit 5. A dummy cell generation circuit 19 generates dummy cells to be described in detail below. An output control circuit 9 selectively outputs the dummy cells generated by the dummy cell generation circuit 19 or the cells outputted from the buffer memory 7 according to externally provided output control signals. A control signal input circuit 11 enters externally provided output control signals for controlling the output control circuit 9. A plurality of output transmission paths 12 including channels #0, #1, . . . , #m from which the cells are outputted are provided. A plurality of cell output circuits 13, provided in correspondence to the channels of the output transmission paths 12, output the cells to the output transmission paths 12. An output conversion unit 15 including a parallel to serial converter (not shown) and a de-multiplexer (not shown) appropriately convert the cells to be outputted from the cell output circuits 13 and a buffer control circuit 17 controls the writing and reading of the cells to and from the buffer memory 7.

In addition, this cell switch 1 further includes a system clock input circuit 21 for entering externally provided system clock signals indicating the circuit operation timings into the cell switch 1. An cell clock input circuit 23 enters the externally provided cell clock signals indicating the cell input and output timings into the cell switch 1. An system clock output circuit 25 outputs the system clock signals in the cell switch 1 to an external device connected to the cell switch 1 and a cell clock output circuit 27 outputs the cell clock signals in the cell switch 1 to an external device connected to the cell switch 1.

In this cell switch 1, when the output control signals controls the output control circuit 9 to selectively output the dummy cells generated by the dummy cell generation circuit 19, regardless of whether the presence or absence of cells entering from the cell input circuits 3 or stored in the buffer memory 7, as well as of the routing information of such cells, only the dummy cells generated by the dummy cell generation circuit 19 are outputted through the output conversion unit 15 and the cell output circuits 13.

Figure 5:
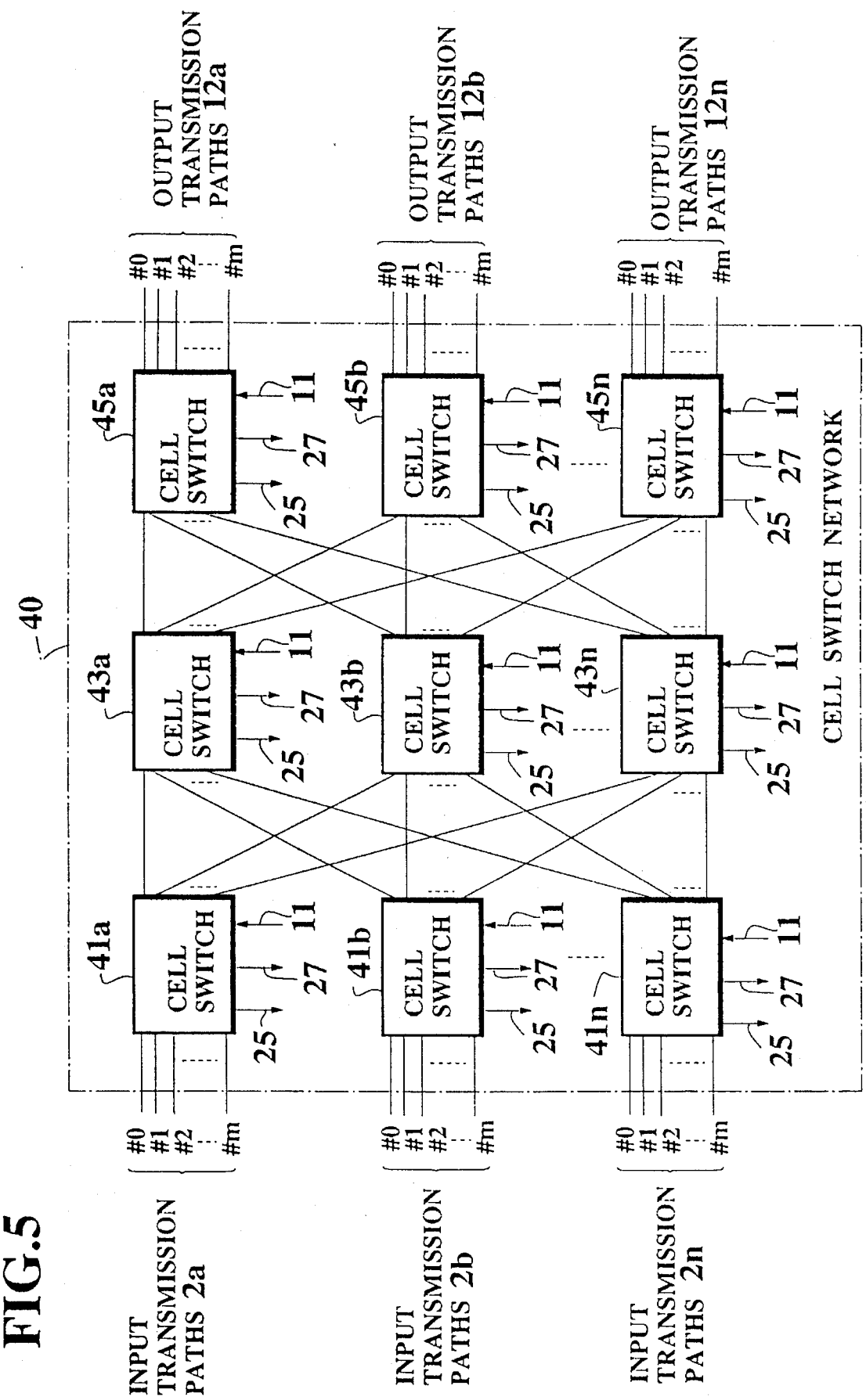
FIG. 5 is a schematic block diagram of one embodiment of a cell switch network formed by inter-connecting a plurality of cell switches similar to the cell switch of FIG. 4.

Referring now to FIG. 5, one embodiment of a cell switch network formed by a plurality of cell switches similar to the cell switch of FIG. 4 will be described in detail.

In this embodiment, the cell switch network 40 includes a plurality of first step cell switches 41a, 41b, . . . , 41n having a plurality of input transmission paths 2a, 2b, . . . , 2n through which the cells are entered into the cell switch network 40. A plurality of second step cell switches 43a, 43b, . . . , 43n have input transmission paths inter-connected with the output transmission paths of the first step cell switches 41a, 41b, . . . , 41n; and a plurality of third step cell switches 45a, 45b, . . . , 45n having the input transmission paths inter-connected with the output transmission paths of the second step cell switches 43a, 43b, . . . , 43n. A plurality of output transmission paths 12a, 12b, . . . , 12n are provided, through which the cells are outputted from the cell switch network 40, where each of the input transmission paths and output transmission paths includes the channels #0 to #m.

In this cell switch network 40, the cell switches are inter-connected in a so called-triple step cross network configuration as shown in FIG. 5.

Figure 6:
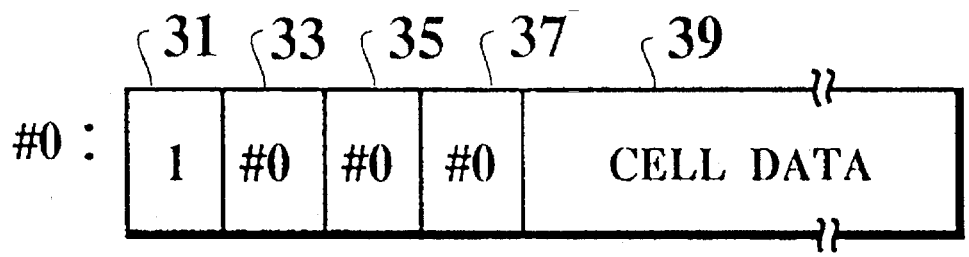
FIGS. 6, 7 and 8 are diagrams of formats for dummy cells to be used in the cell switch network of FIG. 5.
Figure 7:
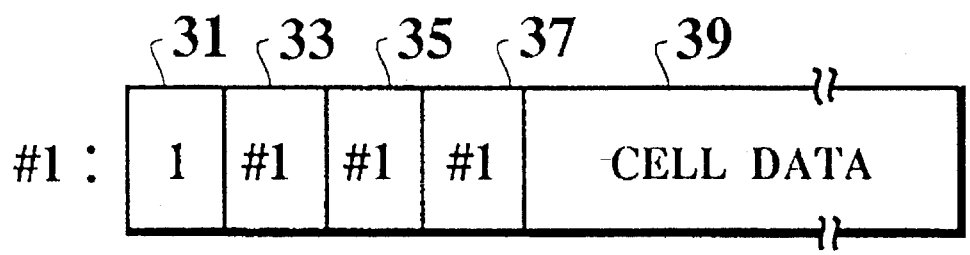
Figure 8:
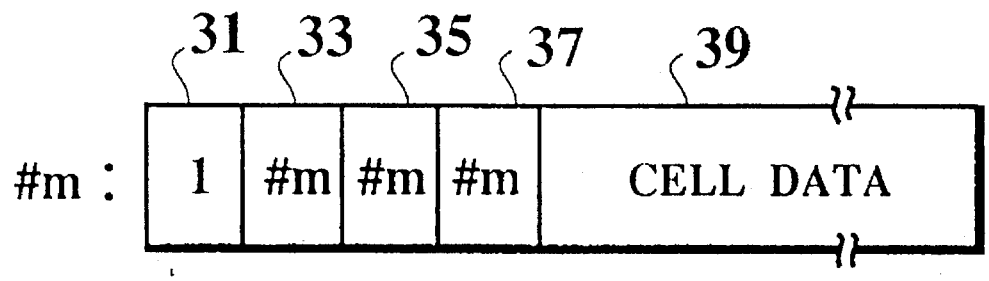

In this embodiment, the dummy cells in formats shown in FIGS. 6, 7, and 8 are used for example. Namely, each cell to be entered into this cell switch network 40 has a top bit field 31 for indicating whether this cell is a valid cell or an empty cell, a first header field 33 for indicating the routing information to be used at the first step cell switches, a second header field 35 for indicating the routing information to be used at the second step cell switches, a third header field 37 for indicating the routing information to be used at the third step cell switches, and a cell data field 39.

In the top bit field 31, a value 1 indicates that it is a valid cell while a value 0 indicates that it is an empty cell, for example. In the first, second, and third header fields 33, 3S, and 37, the value indicates the channel through which it should be transmitted at the respective step.

In the format shown in FIG. 6, all of the first, second, and third header fields 33, 35, and 37 have the value indicating the channel #0, while in the format shown in FIG. 7, all of the first, second, and third header fields 33, 3S, and 37 have the value indicating the channel #1. Similarly, the dummy cell in a format in which all of the first, second, and third header fields 33, 35, and 37 have the same value indicating the single channel #m is provided for each channel m, as shown in FIG. 8.

Accordingly, when the dummy cell of FIG. 6 is entered into the cell switch network 40, this dummy cell is transmitted through the channel #0 at every cell switch it passes, whereas when the dummy cell of FIG. 7 is entered into the cell switch network 40, this dummy cell is transmitted through the channel #1 at every cell switch it passes. Likewise, when the dummy cell of FIG. 8 is entered into the cell switch network 40, this dummy cell is transmitted through the channel #m at every cell switch it passes.

Now, in this cell switch network 40 the verification of the proper connections among the cell switches can be achieved in the following procedure.

First, the dummy cells designed to be transmitted through each of the channels #0 to #m are commanded to be output by the externally supplied output control signals to each one of the third step cell switches 45a to 45n sequentially, such that the proper connections of the output transmission paths of each one of the third step cell switches 45a to 45n can be verified by monitoring the transmission of the dummy cells, while at the same time the test of the cell input and output operation timings between each of the third step cell switches 45a to 45n and the external devices connected to the output transmission paths of that third step cell switch can also be achieved by utilizing the dummy cells for each channel.

Here, the system clock signals outputted from the system clock output circuit 25 of that third step cell switch can be supplied to the external devices connected to it such that this system clock signals can be utilized in adjusting the cell input and output phase relationships between that third step cell switch and the external devices connected to it.

Also, the system clock signals outputted from the system clock output circuit 25 and the cell clock signals outputted from the cell clock output circuit 27 of that third step cell switch can be supplied to the external devices connected to it for the following reason. Namely, once the adjustment of the cell input and output phase relationships is made, the characteristics of the cell clock signals, those of the system clock signals, and those of the cell output, all vary proportionally with each other according to the change of the temperature of the cell switches, so that, by supplying the system clock signals and the cell clock signals from the third step cell switch to the external devices connected to it, the further adjustment of the cell input and output phase relationships between that third step cell switch and the external devices connected to it becomes unnecessary.

Then, after the tests of all the third step cell switches 45a to 45n are finished, the dummy cells designed to be transmitted through each of the channels #0 to #m are commanded to be output by the externally supplied output control signals to each one of the second step cell switches 43a to 43n sequentially, such that the proper connections between each one of the second step cell switches 43a to 43n and the third step cell switches 45a to 45n can be verified by monitoring the transmission of the dummy cells, while at the same time the test of the cell input and output operation timings between each of the second step cell switches 43a to 43n and the third step cell switches 45a to 45n can also be achieved by utilizing the dummy cells for each channel.

Here, similarly to the above, the system clock signals outputted from the system clock output circuit 25 of that second step cell switch can be supplied to the third step cell switches connected to it such that this system clock signals can be utilized in adjusting the cell input and output phase relationships between that second step cell switch and the third step cell switches connected to it.

Also, the system clock signals outputted from the system clock output circuit 25 and the cell clock signals outputted from the cell clock output circuit 27 of that second step cell switch can be supplied to the third step cell switches connected to it for the reason similar to that already described above. Namely, once the adjustment of the cell input and output phase relationships is made, the characteristics of the cell clock signals, those of the system clock signals, and those of the cell output all vary proportionally with each other according to the change of the temperature of the cell switches, so that by supplying the system clock signals and the cell clock signals from the second step cell switch to the third step cell switches connected to it, the further adjustment of the cell input and output phase relationships between that second step cell switch and the third step cell switches connected to it becomes unnecessary.

Then, after the tests of all the second step cell switches 43a to 43n are finished, the output of the dummy cells designed to be transmitted through each of the channels #0 to #m is commanded by the externally supplied output control signals to each one of the first step cell switches 41a to 41n sequentially, such that the proper connections between each one of the first step cell switches 41a to 41n and the second step cell switches 43a to 43n can be verified by monitoring the transmission of the dummy cells, while at the same time the test of the cell input and output operation timings between each of the first step cell switches 41a to 41n and the second step cell switches 43a to 43n can also be achieved by utilizing the dummy cells for each channel.

Here, similarly to the above, the system clock signals outputted from the system clock output circuit 25 of that first step cell switch can be supplied to the second step switches connected to it such that this system clock signals can be utilized in adjusting the cell input and output phase relationships between that first step cell switch and the second step cell switches connected to it.

Also, the system clock signals outputted from the system clock output circuit 25 and the cell clock signals outputted from the cell clock output circuit 27 of that first step cell switch can be supplied to the second step cell switches connected to it for the reason similar to that already described above. Namely, once the adjustment of the cell input and output phase relationships is made, the characteristics of the cell clock signals, those of the system clock signals, and those of the cell output all vary proportionally with each other according to the change of the temperature of the cell switches, so that by supplying the system clock signals and the cell clock signals from the first step cell switch to the second step cell switches connected to it, the further adjustment of the cell input and output phase relationships between that first step cell switch and the second step cell switches connected to it becomes unnecessary.

Thus, in this embodiment, the tests of the cell switches to check the proper connections among the cell switches as well as between the cell switches and the external devices can be completed, along with the tests to check the cell input and output operation timings and the cell input and output phase relationships, in a simplified procedure in which the tests are carried out for the cell switches belonging to each step of the multi-step configuration of the cell switch network sequentially.

Moreover, by supplying the system clock signals and the cell clock signals from the cell switch under the test to the cell switches and the external devices connected to it, once the cell input and output phase relationships between the cell switch under the test and the cell switches and the external devices connected to it are adjusted by using the system clock signals, the further adjustment of the cell input and output phase relationships can be unnecessary.

As described, according to this embodiment, it is possible to provide a cell switch and a cell switch network capable of enabling a simplified cell switch testing for the verification of the proper connections, the check of the cell input and output operational timings, and the check of the cell input and output phase relationships, such that these testing processes can be carried out quickly and easily.

It is to be noted that in the above embodiment, while one of the cell switches in the cell switch network is being tested by using the dummy cells, the data transmission through that cell switch under the test must be suspended during the test period, but the other cell switches of the cell switch network can remain in active operations during that test period, so that the verification of the proper connections, the check of the cell input and output operational timings, and the check of the cell input and output phase relationships can be carried out while the cell switch network is in active operation, i.e., there is no need to entirely stop the communication through this cell switch network for the sake of carrying out these tests.

It is also to be noted that the generation of the dummy cells in the above embodiment should not be confused with the self-test function usually provided in the LSI chip. The LSI chips may be the ingredients of the various elements of the cell switch network, and the usual self-testing function of the LSI cannot be extending to the examination of the network itself.

It is further to be noted that the present invention is applicable to the cell switch network in which a configuration of inter-connection among the cell switches is different from a triple step cross network configuration of the above embodiment shown in FIG. 5, by appropriately adapting the routing information in the header fields of the dummy cells according to the characteristic features of the configuration of inter-connection among the cell switches.

Besides these, many modifications and variations of the above embodiment may be made without departing from the novel and advantageous features of the present invention. Accordingly, all such modifications and variations are intended to be included within the scope of the appended claims.

What is claimed is:

1. A cell switch network comprising:

a plurality of inter-connected cell switches for switching cells entering from a plurality of input transmission paths to a plurality of output transmission paths according to a routing information indicated in a header of each cell, each cell switch including:

buffer memory means, connected with the input transmission paths and the output transmission paths, for storing the cells entered from the input transmission paths;

buffer memory control means for controlling writing and reading operations with respect to the buffer memory means according to the routing information indicated in a header of each cell;

dummy cell generation means for generating dummy cells in correspondence to the output transmission paths, said dummy cells outputted to the output transmission paths and monitored during a test for testing connections of the cell switch; and output control means for selectively outputting the dummy cells generated by the dummy cell generation means to the output transmission paths when the test for testing connections of the cell switch is indicated by an externally provided control signal supplied to the output control means, and selectively outputting the cells outputted from the buffer memory means to the output transmission paths otherwise;

wherein a part of said plurality of inter-connected cell switches is subjected to the test for testing connections while a remaining part of said plurality of inter-connected cell switches remain in an operation for switching the cells in the network.

2. The cell switch network of claim 1, wherein the output transmission paths include a plurality of output channels and each of the dummy cells has a header indicating the routing information specifying one of the output channels of the output transmission paths to which said each of the dummy cells is selectively outputted by the output control means.

3. The cell switch network of claim 1, further comprising:

cell clock input means for inputting externally provided cell clock signals indicating timings for writing and reading of the cells in the cell switch; and cell clock output means for outputting the cell clock signals to other cell switches connected to the output transmission paths of the cell switch in order to check cell input and output operation timings between the cell switch and the other cell switches.

4. The cell switch network of claim 1, further comprising:

system clock input means for inputting externally provided system clock signals indicating timings for switching operations in the cell switch; and system clock output means for outputting the system clock signals to other devices connected to the output transmission paths of the cell switch in order to adjust cell input and output phase relationships between the cell switch and the other devices.

5. The cell switch network of claim 1, wherein the cell switches are inter-connected in a form of a multi-step configuration.

6. The cell switch network of claim 5, wherein the output transmission paths includes a plurality of output channels and each of the cells and the dummy cells has a header indicating the routing information specifying one of the output channels of the output transmission paths to which said each of the cells and the dummy cells is to be outputted at the cell switch of each step in the multi-step configuration of the cell switch network.

7. A cell switch for switching cells entering from a plurality of input transmission paths to a plurality of output transmission paths according to a routing information indicated in a header of each cell, the cell switch comprising:

buffer memory means, connected with the input transmission paths and the output transmission paths, for storing the cells entered from the input transmission paths;

buffer memory control means for controlling writing and reading operations with respect to the buffer memory means according to the routing information indicated in a header of each cell;

dummy cell generation means for generating dummy cells in correspondence to the output transmission paths, said dummy cells outputted to the output transmission paths and monitored during a test for testing connections of the cell switch; and output control means for selectively outputting the dummy cells generated by the dummy cell generation means to the output transmission paths when the test for testing connections of the cell switch is indicated by an externally provided control signal supplied to the output control means, and selectively outputting the cells outputted from the buffer memory means to the output transmission paths otherwise.

8. The cell switch of claim 7, wherein the output transmission paths includes a plurality of output channels and each of the dummy cells has a header indicating the routing information specifying one of the output channels of the output transmission paths to which said each of the dummy cells is selectively outputted by the output control means.

9. The cell switch of claim 7, further comprising:

cell clock input means for inputting externally provided cell clock signals indicating timings for writing and reading of the cells in the cell switch; and cell clock output means for outputting the cell clock signals to other cell switches connected to the output transmission paths of the cell switch in order to check cell input and output operation timings between the cell switch and the other cell switches.

10. The cell switch of claim 7, further comprising:

system clock input means for inputting externally provided system clock signals indicating timings for switching operations in the cell switch; and system clock output means for outputting the system clock signals to other devices connected to the output transmission paths of the cell switch in order to adjust cell input and output phase relationships between the cell switch and the other devices.

11. A cell switch network comprising:

a plurality of inter-connected cell switches for switching cells entering from a plurality of input transmission paths to a plurality of output transmission paths according to a routing information indicated in a header of each cell, each cell switch including:

buffer memory means, connected with the input transmission paths and the output transmission paths, for storing the cells entered from the input transmission paths;

buffer memory control means for controlling writing and reading operations with respect to the buffer memory means according to the routing information indicated in a header of each cell;

dummy cell generation means for generating dummy cells in correspondence to the output transmission paths, said dummy cells outputted to the output transmission paths and monitored during a test for testing connections of the cell switch; and output control means for selectively outputting the dummy cells generated by the dummy cell generation means to the output transmission paths when the test for testing connections of the cell switch is indicated by an externally provided control signal supplied to the output control means, and selectively outputting the cells outputted from the buffer memory means to the output transmission paths otherwise.

12. The cell switch network of claim 11, wherein the output transmission paths includes a plurality of output channels and each of the dummy cells has a header indicating the routing information specifying one of the output channels of the output transmission paths to which said each of the dummy cells is selectively outputted by the output control means.

13. The cell switch network of claim 11, further comprising:

cell clock input means for inputting externally provided cell clock signals indicating timings for writing and reading of the cells in the cell switch; and cell clock output means for outputting the cell clock signals to other cell switches connected to the output transmission paths of the cell switch in order to check cell input and output operation timings between the cell switch and the other cell switches.

14. The cell switch network of claim 11, further comprising:

system clock input means for inputting externally provided system clock signals indicating timings for switching operations in the cell switch; and system clock output means for outputting the system clock signals to other devices connected to the output transmission paths of the cell switch in order to adjust cell input and output phase relationships between the cell switch and the other devices.

15. The cell switch network of claim 11, wherein the cell switches are interconnected in a form of a multi-step configuration.

16. The cell switch network of claim 15, wherein the output transmission paths includes a plurality of output channels and each of the cells and the dummy cells has a header indicating the routing information specifying one of the output channels of the output transmission paths to which said each of the cells and the dummy cells is to be outputted at the cell switch of each step in the multi-step configuration of the cell switch network.

\* \* \* \* \*